United States Patent Office 3,157,508
Patented Nov. 17, 1964

3,157,508
PHOTOGRAPHIC MATERIAL FOR THE SILVER DYE BLEACHING PROCESS
Paul Dreyfuss, Basel, Switzerland, assignor to Ciba Corporation, New York, N.Y., a corporation of Delaware
No Drawing. Filed Dec. 31, 1962, Ser. No. 248,301
Claims priority, application Switzerland, Jan. 9, 1962, 186/62
5 Claims. (Cl. 96—99)

The present invention relates to photographic material for use in the silver dye bleaching method. As is known, the said method is based on the fact that numerous dyes used for dyeing the layer-formers, more especially gelatine, are destroyed by reduction of the azo bridges— depending on the amount of image silver present—when acted upon by suitable dye bleaching baths. Materials for the production of polychrome pictures to be viewed by reflected light by the aforesaid method comprise, for example, on a support consisting of baryta paper or of pigmented and substrated cellulose acetate a red-sensitized emulsion layer containing a cyan dye, a thin interlayer, a green-sensitized emulsion layer containing a magenta dye, a yellow filter layer, and on top an emulsion layer which is sensitive only to blue and contains a yellow dye.

A cyan dye suitable for incorporation in such a material must satisfy very stringent demands: Inter alia, it must not reduce the speed of the red-sensitized emulsion; it must not diffuse into the base layer nor into the magenta layer; it must be capable of being bleached easily and colorless in the dye bleaching bath; it must be fast to light and satisfy specific spectral demands.

The present invention is based on the observation that the demands mentioned above are satisfied to a high degree by dyes of the composition defined below. Accordingly, the present invention relates to photographic materials for use in the silver dye bleaching method which contain on a support a layer containing at least one dyestuff of the formula (1) 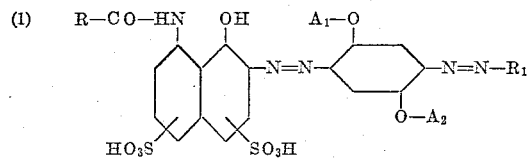

in which $A_1$ and $A_2$ each represents an alkyl radical with 1 or 2 carbon atoms, R represents a benzene radical and $R_1$ the radical of 2-hydroxynaphthalene-7-sulfonic acid bound in position 1 to the azo bridge, or the radical of 1-hydroxynaphthalene-3-sulfonic acid bound in position 2 to the azo bridge.

The above-mentioned dyes can be manufactured, for example, by diazotizing 1-amino-2:5-diethoxy-4-nitrobenzene or a 1-amino-4-nitrobenzene containing in one of the positions 2 and 5 a methoxy group and in the other of these positions an ethoxy group, but preferably 1-amino-2:5-dimethoxy-4-nitrobenzene, coupling the resulting diazo compound with a 1-benzoylamino-8-hydroxynaphthalene-disulfonic acid, reducing the nitroazo dye, then diazotizing the aminoazo dyestuff and coupling the resulting diazo compound with 1-hydroxynaphthalene-3-sulfonic acid or preferably with 2-hydroxynaphthalene-7-sulfonic acid. These reactions may be carried out in the usual manner.

Suitable 1-benzoylamino-8-hydroxynaphthalene-disulfonic acids are, for example, the following:

1-benzoylamino - 8-hydroxynaphthalene - 3:6 - disulfonic acid,
1-(2':4'-dichlorobenzoylamino) - 8 - hydroxynaphthalene-4:6-disulfonic acid, and
1-(4'-acetylaminobenzoylamino) - 8-hydroxynaphthalene-3:6-disulfonic acid.

Preferred use is made of the dyes of the formula (2) 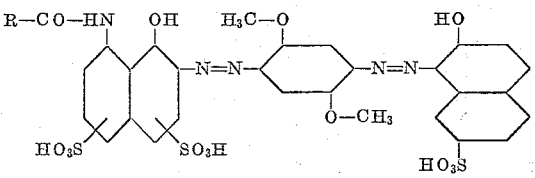

in which R is a benzene radical.

In contradistinction to similar, known dyes the dyes of the invention have above all very favorable spectral properties, more especially a very low absorption in the blue spectral range. They do not diffuse into the colorless base layer nor into the supernatant magenta layer. They reduce the speed of a silver bromide emulsion sensitized to red only to a minor degree. They are fast to light and are not attacked even in oxidation baths containing a chromate, such as are used for the reversal/reversal process. They are quite colorless after having been bleached in the usual acid dye bleaching baths, and the intermediate tints containing only part of the dye, such as result in bleaching, are of equal spectral purity as the unbleached dye; more especially, the color of these intermediate tints is not shifted towards blue-violet. In addition, the color and depth of images produced with these dyes is less dependent on variations of the pH value than is the case with images produced with comparable, known dyes.

The dyes of the invention are very easy to bleach even in the bottommost layer of a multipack material and produce color images distinguished by their flat and straight-line gradation. The alkali metal salts of the color acids are readily soluble in water and increase the viscosity of gelatine only moderately when added to a silver salt emulsion in gelatine. They are therefore excellently suitable for incorporation in the red-sensitized bottommost silver bromide-gelatine emulsion layer of a multi-pack material, more especially material used for producing polychrome images to be viewed by reflected light.

Unless otherwise indicated, parts and percentages in the following examples are by weight.

Example 1

The following layers are cast in the indicated order of succession on a cellulose acetate film containing a white pigment:

A red sensitized silver bromide emulsion containing the cyan dye of the formula (3) 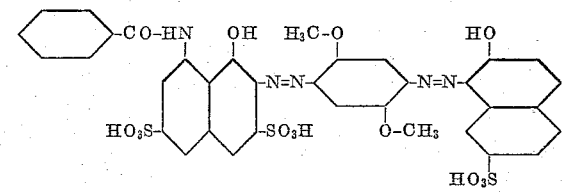

A thin gelatine interlayer.

A green-sensitized bromide emulsion containing the magenta dye of the formula

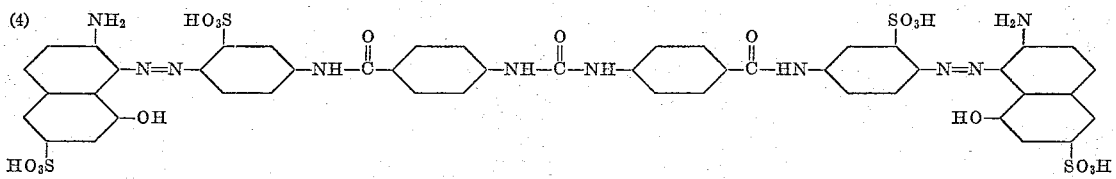

A filter layer containing the dye of the formula

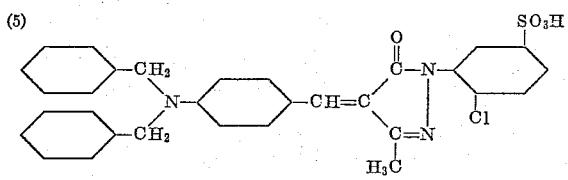

An unsensitized silver bromide emulsion containing the dye of the formula

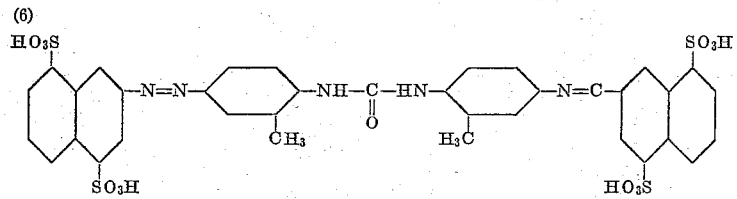

The material is exposed, developed, fixed and hardened, then bleached in a dye bleaching bath containing hydrochloric acid, potassium bromide, thiourea and 2-amino-3-hydroxyphenazine, and finally freed from excess silver. An image corresponding to the master is obtained.

The dye of the Formula 3 is prepared in the following manner: 198 parts of 1-amino-2:5-dimethoxy-4-nitrobenzene are diazotized in a strongly hydrochloric suspension. The clear solution is coupled with 423 parts of 1-benzoylamino-8-hydroxynaphthalene-3:6-disulfonic acid in a solution rendered alkaline with sodium carbonate. The resulting nitroazo dye is reduced in an alkaline solution with sodium sulfide to the corresponding amino-azo dye which is isolated, again diazotized and isolated. The diazo compound is introduced into a solution of 224 parts of 2-hydroxynaphthalene-7-sulfonic acid in aqueous pyridine. On completion of the coupling reaction the dye is repeatedly redissolved in water and salted out each time until it is free from violet impurities, then salted out with sodium acetate, filtered off and washed with ethanol.

*Example 2*

The same kind of layers as described in Example 1 are cast one on top of the other on baryta paper. The coated material is exposed, developed and hardened; the developed silver is removed and the residual silver bromide is reduced. The material is then bleached in a dye bleaching bath as in Example 1, and finally freed from excess silver. The resulting image is complementary to the master.

*Example 3*

Similar results are obtained when in the process described in Example 1 the dye of the Formula 3 is replaced by one of the dyes of the following formulae:

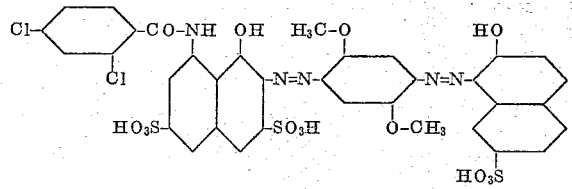

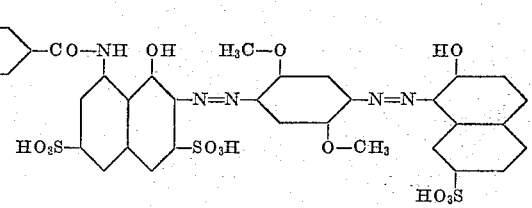

(9) 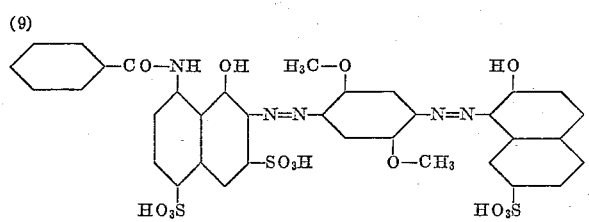

(10) 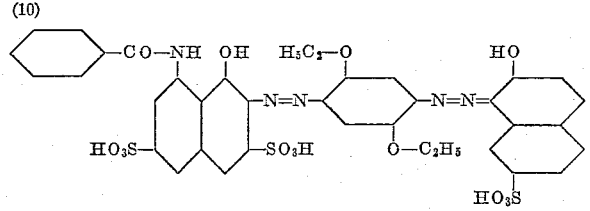

(11) 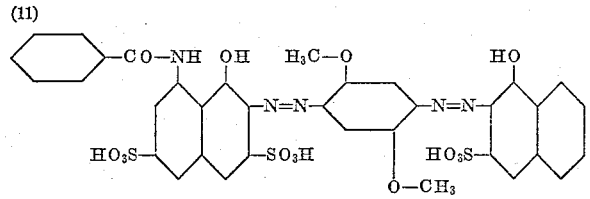

What is claimed is:

1. Photographic material for the silver dyestuff bleaching process, which contains on a support a layer containing a red sensitized gelatino-silver halide emulsion and at least one dyestuff of the formula

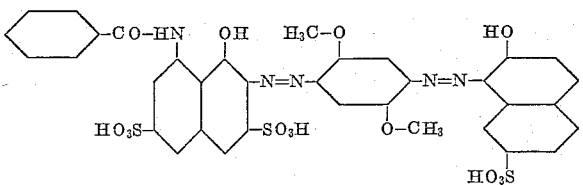

in which R represents a monocyclic benzene radical.

2. Photographic material for the silver dyestuff bleaching process, which contains on a support a layer containing a red sensitized gelatino-silver halide emulsion and the dyestuff of the formula

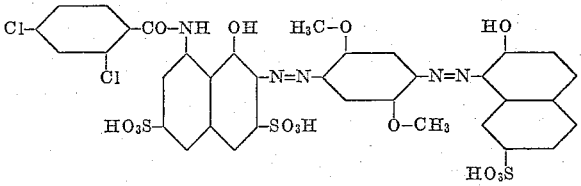

3. Photographic material for the silver dyestuff bleaching process, which contains on a support a layer containing a red sensitized gelatino-silver halide emulsion and the dyestuff of the formula 4. Photographic material for the silver dyestuff bleaching process, which contains on a support a layer containing a red sensitized gelatino-silver halide emulsion and the dyestuff of the formula

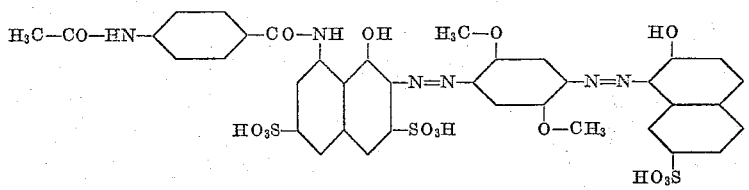

5. Photographic material for the silver dyestuff bleaching process, which contains on a support a layer containing a red sensitized gelatino-silver halide emulsion and the dyestuff of the formula

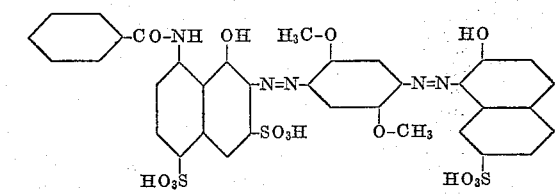

References Cited in the file of this patent
UNITED STATES PATENTS
2,612,448    Gaspar et al. _____ Sept. 30, 1952